United States Patent Office 3,048,564
Patented Aug. 7, 1962

3,048,564
PROCESS FOR PREPARING POLYETHYLENE
TEREPHTHALATE
Carl J. Heffelfinger, Circleville, Ohio, assignor to E. I. du Pont de Nemours and Company, Wilmington, Del., a corporation of Delaware
No Drawing. Filed Aug. 26, 1957, Ser. No. 680,436
12 Claims. (Cl. 260—75)

This invention relates to the preparation of a highly polymeric linear terephthalic ester, shaped structures thereof, and particularly a film thereof having improved electrical properties.

This application is a continuation-in-part of pending application Serial No. 485,283, filed January 31, 1955, by Carl J. Heffelfinger.

The production of the novel class of film- and fiber-forming linear polyesters of terephthalic acid and a glycol of the series $HO(CH_2)_nOH$ where "$n$" is an integer from 2 to 10, inclusive, is fully disclosed in U.S. Patent 2,465,319 to Whinfield and Dickson. From a commercial standpoint, one of the most attractive polymers of this class is polyethylene terephthalate; and the most promising process for its production comprises carrying out an ester interchange between ethylene glycol and dimethyl terephthalate to form bis-2-hydroxyethyl terephthalate monomer which is polymerized to polyethylene terephthalate under reduced pressure and at elevated temperatures.

Polyethylene terephthalate film particularly oriented heat-set film, i.e., film stretched substantially the same amount, e.g., 3 times (3× where "×" equals the original dimension of the film) in both directions or film which has been rolled to substantially the same extent in both directions, or film stretched in one direction and rolled in a direction perpendicular thereto to form a substantially balanced, i.e., having substantially the same physical properties as measured in both directions, has been found to possess a unique combination of electrical, chemical and physical properties which make it outstanding for use as a dielectric. Heat-setting of the film is normally carried out at temperatures ranging from 150°–250° C., preferably about 200° C., while restricting dimensional change of the film. It should also be mentioned that the outstanding electrical properties, strength, and durability of polyethylene terephthalate film are substantially retained at elevated temperatures to the extent that the film is particularly outstanding for use as a dielectric in capacitors, motors, generators, transformers and other electrical apparatus which are required to operate efficiently at ambient temperatures approaching 150°–175° C.

In evaluating the adaptability of the various candidate dielectric materials, one of the most important electrical properties to be considered is that of the insulation resistance of the dielectric. In more specific terms, the insulation resistance of a dielectric is the resistivity of the material, that is, the resistance the dielectric offers to the flow of current therein. For use in high impedance (the resistance in a circuit to the flow of current) circuits, a dielectric in capacitors, for example, should have a resistance as high as possible in order to operate without breakdown for long durations, particularly at elevated temperatures.

In the manufacture of polyethylene terephthalate film from a polymer prepared in accordance with the general teaching of aforementioned U.S. Patent 2,465,319, it is preferred to carry out in a continuous operation, the steps of:

(1) Ester interchange between glycol and dimethyl terephthalate to form bis-2-hydroxyethyl terephthalate monomer;

(2) Polymerization of the monomer to form a high molecular weight polyethylene terephthalate;

(3) Subsequent formation of polymer into film.

The smooth operation of such a continuous process may be adversely affected by a variety of side effects, and the continuous preparation of an oriented film of polyethylene terephthalate from glycol and dimethyl terephthalate is no exception. One of the formidable difficulties encountered in this process is the formation of striations in the film. These striations seem to originate at the lips of the extrusion die from which the molten polymer is formed into film. The appearance of striations necessitates closing down the operation for cleaning the lips of the die. During these interruptions, polymer must be dumped resulting not only in the loss of production time but in the loss of material as well.

It is an object of the present invention to provide an improved process of preparing highly polymeric linear terephthalic ester. Another object is to provide an improved continuous process for the production of shaped structures therefrom which process substantially avoids the aforementioned maintenance problems. A further object is to prepare polyethylene terephthalate film particularly useful as a dielectric in capacitors. Other objects will be apparent from the description of the invention given hereinafter.

The above objects are accomplished according to the present invention by carrying out the polymerization of bis-2-hydroxyethyl terephthalate, the ester resulting from the reaction of ethylene glycol and dimethyl terephthalate, in the presence of a phosphorous compound selected from the group consisting of monoammonium phosphate, monoammonium phosphite and diammonium phosphate, preferably in the presence of at least .05% by weight of the aforementioned compounds based on the weight of the dimethyl terephthalate used in the initial ester interchange reaction. The aforementioned inorganic phosphate or phosphite may be added at any time prior to or during polymerization.

In one embodiment of the invention polyethylene terephthalate is prepared in the presence of a catalyst system comprising catalytic amounts of (1) an alkaline metal from the group consisting of lithium, sodium, calcium and magnesium, and their hydrides, alcoholates, chlorides, and glycol-soluble salts of monocarboxylic acids; (2) a glycol-soluble salt of a monocarboxylic acid and a metal from the group consisting of zinc and cadmium; (3) an antimony compound from the group consisting of antimony trioxide, antimonyl potassium tartrate, antimonous oxychloride, antimony trifluoride, and sodium antimonyl hydroxy acetate; (4) and a phosphorus compound from the group consisting of monoammonium and diammonium phosphates and monoammonium phosphite; forming a film from the resulting polymer; elongating the film at least about 2.5 times its original dimensions in at least one, preferably two directions; and heating the film to a temperature of 150°–250° C. while restricting dimensional change of the film.

Representatives of the specific compounds falling within the group labeled (1) include lithium metal, sodium metal, lithium hydride, lithium glycolate (prepared by reacting a lithium hydride or lithium hydroxide with ethylene glycol), calcium hydride and magnesium acetate. The concentration of such compounds in the reaction mixture should, in general, fall within the range of from 0.003% to 0.015%, based on the weight of dialkyl terephthalate employed in the initial ester interchange reaction.

As examples of specific salts of glycol-soluble monocarboxylic acids and a metal from the group consisting of zinc and cadmium, i.e., in the group labeled (2), there may be mentioned zinc acetate, zinc lactate, zinc salicylate, and cadmium acetate and cadmium salicylate. Glycol-soluble zinc and cadmium salts of higher monocarboxylic acids, including those containing up to 18 carbon atoms, e.g., propionic, butyric, valeric, stearic, lauric, are entirely satisfactory. These salts, as well as the antimony compounds, should be used in concentrations within the range of from 0.02% to 0.05%, based upon the weight of dialkyl terephthalate.

The term "glycol-soluble," employed herein to define the organic salts of the metals enumerated above, applies to those salts which are soluble in ethylene glycol in catalytic amounts, that is, up to about 0.1%, based upon the weight of dialkyl terephthalate, e.g., dimethyl terephthalate. Many of the salts defined herein are soluble in cold, i.e., room temperature, glycol; but the term "glycol-soluble" is meant to include solubility in hot glycol, i.e., temperatures up to 140°–150° C. These soluble salts are known generally as homogeneous catalysts because their solubility in glycol provides for a homogeneous system as contrasted to a heterogeneous system.

The inorganic phosphorus compounds which may be employed in the practice of the present invention include monoammonium phosphate, diammonium phosphate and monoammonium phosphite. Mixtures of these phosphorus compounds may be used. Normally, in order to derive the beneficial effects of the present invention at least 0.05%, by weight, of the phosphorus compound, based upon the weight of dialkyl terephthalate, should be present in the polymerization system. To obtain substantial improvement in electrical insulation resistance at least about 0.09%, by weight, of the phosphorus compound should be present in the polymerization system. It is preferred to add the phosphorus compound to the system just prior to polymerization of the bis-2-hydroxyethyl terephthalate resulting from the ester interchange reaction. Furthermore, the phosphorus compound may be added during the early stages of polymerization so long as the polymer is not too viscous, and sufficient time is permitted for mixing with the molten polymer at elevated temperatures.

It should be mentioned that other inorganic phosphorus compounds, such as mono- or di-sodium phosphites and phosphates, sodium hypophosphite, sodium phosphomolybdate, and glycero-phosphoric acid disodium salt, have not been found to be equivalent to the subject ammonium phosphites and phosphates in effecting the improvement in insulation resistance of polyethylene terephthalate film.

Copending application U.S. Serial No. 383,372, filed September 30, 1953, in the name of L. E. Amborski, E. F. Izard and C. E. Sroog, relates to the preparation of polyethylene terephthalate film formed from polymer prepared in the presence of a combination of catalysts selected from the groups (1), (2), (3), as defined hereinbefore, and in the presence of (4) a phosphorus compound from the group consisting of alkyl, phenyl, alkyl phenyl and hydroxy alkyl phosphite and phosphate esters, phosphorus acid and phosphoric acid. All of the phosphorus compounds falling within the scope of the organic phosphorus compounds have been found to effect a desirable improvement in the insulation resistance of polyethylene terephthalate film formed from polymer prepared in the presence of these organic phosphorus compounds. However, the use of typical individual organic phosphorus compounds results in creating certain process difficulties, particularly in equipment designed for carrying out the ester interchange and polymerization continuously. The use of phosphoric or phosphorus acids creates an acidic reaction medium which is relatively highly corrosive to stainless steel equipment. An excessively acid reaction medium also appears to promote the formation of diethylene glycol, which, in excessive concentrations, tends to reduce the ultimate physical properties of the polyethylene terephthalate film. The use of glycol phosphites or phosphates, comprising a hydroxy alkyl phosphite or phosphate (prepared by reacting an alkyl phosphite or phosphate with ethylene glycol in the presence of catalytic amounts of lithium hydride, as described and claimed in copending application U.S. Serial No. 415,683, filed March 11, 1954, in the name of C. E. Sroog, now issued as U. S. Patent No. 2,728,790), also leads to creating an excessively acidic reaction medium. On the other hand, use of an alkyl phosphite or phosphate in the high temperature polymerization system necessary for preparing polyethylene terephthalate results in vaporizing, and thereby losing, considerable portions of the alkyl phosphite or phosphate before ample time is provided for reaction of the alkyl phosphite or phosphate in the polymerization reaction. Furthermore, the use of various aromatic phosphites and phosphates tend to liberate objectionable by-products which find their way into the glycol evolved and recovered during the polymerization reaction. Such impurities, for example, cresylic by-products formed when tricresyl phosphite or phosphate is employed, are difficult to separate from the glycol, and consequently render the recovered glycol difficult and in most cases uneconomical to purify.

The present invention resides in the discovery that the presence in the polymerization system of the ammonium phosphite or the ammonium phosphates as defined herein, provides for continuous operation which is less subject to maintenance problems. One of the essential benefits of this invention is in connection with a continuous operation wherein the ester interchange, polymerization of the product of ester interchange, and subsequent formation (extrusion) of the polymer into film are carried out continuously. In the presence of a phosphorus compound, the continuous process may be operated from 3 to 10 times (or greater) as long as the same process without phosphorus compound without the necessity of cleaning the film extrusion die. The benefit of the invention is gained, particularly when ester interchange, polymerization, and film extrusion are carried out continuously, when any effective and suitable ester interchange and polymerization catalysts are employed.

The present invention also resides in the discovery that the use of ammonium or diammonium phosphate or monoammonium phosphite, in conjunction with a catalyst system selected from groups 1, 2, and 3, as defined hereinbefore, leads to the formation of polyethylene terephthalate, without the disadvantages mentioned above in connection with the use of organic phosphorus compounds, and in addition thereto, film formed from the resulting polymer exhibits a substantial improvement in electrical insulation resistance.

The following examples will serve to illustrate the practice and principles of the present invention.

In electrical applications in general, as mentioned hereinbefore, the insulating material or dielectric is subjected to electrical stresses which result in current flow in the dielectric. The current flow increases as a result of decreasing resistivity at elevated temperatures. In the case of capacitors, this effect is particularly important because the flow of current results in higher temperatures and shorter life. The resistivity of polyethylene terephthalate film dielectric is measured by constructing a capacitor, using the film as the dielectric, and connecting a capacitor into a high resistance bridge circuit (General Radio megohm bridge, type 544–B). Two types of capacitors are used. In the first, a wound capacitor is assembled and the dielectric is evaluated in terms of megohms×microfarads. In the second method, a single sheet of test dielectric is used, and the resistance value measured in ohms is used to calculate volume resistivity (across opposite faces of a unit cube) in terms of ohm-centimeters. The wound capacitor consists of alternate single layers of polyethylene terephthalate film (2″ in width) and aluminum (1½″ in width). The length of the film wound into the capacitor is determined by the desired capacitance. The resistance of the wound capacitor is measured at 130° C. on a megohm bridge and then the capacitance is measured under the same conditions using a Cornell-Dubilier capacitor analyzer. The product of the two values gives a megohms×microfarads value. The single sheet measurement is made by painting a round electrode (2" in diameter) on each side of the specimen of known thickness. The specimen is placed between brass plates of the electrode cell which is connected to the megohm bridge. The resistance in ohms at 170° C. is used to calculate resistivity, $r$, in ohm-centimeters from the following relationship:

$$r = \frac{R \times A}{t}$$

where

R equals resistance in ohms at 170° C.;
A equals area in square centimeters;
$t$ equals thickness in centimeters.

The data on insulation resistance tabulated in Table I below were obtained from testing film extruded from polymer prepared as follows: Glycol and dimethyl terephthalate were introduced into a batch reactor, e.g., an autoclave fitted with stirring means; an ester interchange reaction was carried out at atmospheric pressure and within a temperature range between 140°–220° C.; and methanol when comparing films extruded from polymer prepared in the presence of exactly the same catalyst system and phosphorus compound and the same concentrations of these materials. It should be emphasized, however, that the insulation resistance of films having a thickness of 1 mil or greater, e.g., 1–2½ mils, may be compared directly.

In Table I, the quantities of the compounds making up the catalyst system, including the phosphorus compound, are expressed in terms of percentages, based upon the weight of dimethyl terephthalate charged to the reactor. However, the molecular weight of dimethyl terephthalate is substantially the same as the molecular weight of a unit of polymer; hence, the percentages of catalysts and the phosphorus compounds are also substantially equivalent to percent by weight of the resulting polymer.

Intrinsic viscosity, referred to hereinbefore and denoted by the symbol $n_0$, indicates the degree of polymerization of the polyester and may be defined as $$\frac{\text{Limit ln }(n_r)}{C} \text{ as } C \text{ approaches } 0$$

wherein $n_r$ is the viscosity of a dilute phenol-tetrachloroethane (60–40) solution of the polyester divided by the viscosity of the phenol-tetrachloroethane mixture per se measured in the same units at the same temperature, and C is the concentration in grams of polyester per 100 cc. of solution.

TABLE I

| Example | Catalyst combination and quantity [1] | Phosphorus additive and quantity [1] | Ratio of mols of phosphorus compound to total mols of catalyst | Insulation resistance (ohm-cm.) at 170° C. | Film thickness (mils) |
|---|---|---|---|---|---|
| Control | 0.006 LiH, 0.035 Zn(Ac)$_2$.2H$_2$O, 0.03 Sb$_2$O$_3$ | | | 2.23×10$^{11}$ | <1 |
| Do | 0.006 LiH, 0.035 Zn(Ac)$_2$.2H$_2$O, 0.03 Sb$_2$O$_3$ | | | 1.23×10$^{11}$ | <1 |
| Do | 0.006 LiH, 0.035 Zn(Ac)$_2$.2H$_2$O, 0.03 Sb$_2$O$_3$ | | | 3.64×10$^{11}$ | <1 |
| 1 | 0.006 LiH, 0.035 Zn(Ac)$_2$.2H$_2$O, 0.03 Sb$_2$O$_3$ | 0.179 (NH$_4$)$_2$HPO$_4$ | 1.33 | 1.37×10$^{13}$ | 0.91 |
| 2 | 0.006 LiH, 0.035 Zn(Ac)$_2$.2H$_2$O, 0.03 Sb$_2$O$_3$ | 0.155 NH$_4$H$_2$PO$_4$ | 1.32 | 1.30×10$^{13}$ | 0.70 |
| 3 | 0.008 LiH, 0.02 Zn(Ac)$_2$.2H$_2$O, 0.03 Sb$_2$O$_3$ | 0.155 NH$_4$H$_2$PO$_4$ | 1.12 | 2.17×10$^{13}$ | <1 |
| 4 | 0.008 LiH, 0.02 Zn(Ac)$_2$.2H$_2$O, 0.03 Sb$_2$O$_3$ | 0.155 NH$_4$H$_2$PO$_4$ | 1.12 | 4.85×10$^{13}$ | 0.24 |
| 5 | 0.008 LiH, 0.02 Zn(Ac)$_2$.2H$_2$O, 0.03 Sb$_2$O$_3$ | 0.179 (NH$_4$)$_2$HPO$_4$ | 1.13 | 5.4×10$^{13}$ | 0.28 |
| Control | 0.045 Mn(Ac)$_2$.2½H$_2$O, 0.006 LiH, 0.03 Sb$_2$O$_3$ | | | 3.42×10$^{11}$ | 0.24 |
| 6 | 0.045 Mn(Ac)$_2$.2½H$_2$O, 0.006 LiH, 0.03 Sb$_2$O$_3$ | 1.167 NH$_4$H$_2$PO$_4$ | 1.33 | 2.92×10$^{12}$ | 0.29 |
| 7 | 0.02 Mn(Ac)$_2$.2½H$_2$O, 0.008 LiH, 0.03 Sb$_2$O$_3$ | 0.03 NH$_4$H$_2$PO$_4$ | 0.22 | 1.55×10$^{12}$ | 0.44 |
| 8 | 0.008 LiH, 0.02 Zn(Ac)$_2$.2H$_2$O, 0.03 Sb$_2$O$_3$ | 0.155 NH$_4$H$_2$PO$_4$ | 1.12 | 3.53×10$^{12}$ | 0.20 |
| 9 | 0.015 LiH, 0.02 Zn(Ac)$_2$.2H$_2$O, 0.03 Sb$_2$O$_3$ | 0.155 NH$_4$H$_2$PO$_4$ | 0.65 | 1.28×10$^{13}$ | 0.29 |
| 10 | 0.0111 LiH, 0.02 Zn(Ac)$_2$.2H$_2$O, 0.03 Sb$_2$O$_3$ | 0.111 NH$_4$H$_2$PO$_4$ | 0.61 | 1.36×10$^{13}$ | 0.28 |
| 11 | 0.008 LiH, 0.02 Zn(Ac)$_2$.2H$_2$O, 0.03 Sb$_2$O$_3$ | 0.0555 NH$_4$H$_2$PO$_4$ | 0.40 | 3.04×10$^{12}$ | 0.31 |
| 12 | 0.008 LiH, 0.02 Zn(Ac)$_2$.2H$_2$O, 0.03 Sb$_2$O$_3$ | 0.155 NH$_4$H$_2$PO$_4$ | 1.12 | 2.66×10$^{13}$ | 0.32 |
| 13 | 0.008 LiH, 0.02 Zn(Ac)$_2$.2H$_2$O, 0.03 Sb$_2$O$_3$ | 0.179 (NH$_4$)$_2$HPO$_4$ | 1.13 | 3.85×10$^{12}$ | 0.25 |

[1] Weight percent of weight of dimethyl terephthalate.

NOTE.—NH$_4$H$_2$PO$_4$, monoammonium phosphate; Sb$_2$O$_3$, antimony trioxide; LiH, lithium hydride; (NH$_4$)$_2$HPO$_4$, diammonium phosphate; Mn(Ac)$_2$.2½H$_2$O, hydrated manganese acetate; Zn(Ac)$_2$.2H$_2$O, zinc acetate dihydrate.

was continuously withdrawn from the reactor. At the end of the ester interchange step polymerization of bis-2-hydroxyethyl terephthalate was carried out within the temperature range between 230°–290° C. under reduced pressure within the range of from 0.05–2.5 mm. of mercury. During polymerization, glycol wa continuouly withdrawn from the reactor along with the ammonia by-product. The ammonium phosphite or phosphate dissolved in glycol was injected into the reactor after completion of the ester interchange reaction. The polymerization reaction was carried out until the desired intrinsic viscosity was attained, i.e, within the range from 0.55–0.65. Thereafter, the polymer was introduced into an extrusion apparatus from which the polymer was continuously extruded into film in amorphous form. This film was then continuously stretched longitudinally and then transversely to substantially the same extent (3×) in each direction to form a substantially balanced film, i.e., physical properties being substantially the same in both directions. Finally, the film was heat-set at 200° C. while held under tension. The thicknesses of the resulting biaxially stretched balanced film are indicated in Table I. It should be pointed out that the insulation resistance of films having a thickness less than about 0.001" (1 mil) is less than that of films having greater thickness, that is, The data in Table II were collected from measurements made upon polyethylene terephthalate film prepared in accordance with a continuous process briefly described as follows: Glycol and dimethyl terephthalate were continuously fed into the top of an ester interchange reaction column. Methanol was continuously removed from the top of the column, and bis-2-hydroxyethyl terephthalate was withdrawn from the bottom of the column. The ester interchange and polymerization catalysts were fed to the ester interchange column with the reactants, that is, with the glycol and dimethyl terephthalate. The phosphorus compound dissolved in glycol was normally injected into the liquid product of ester interchange; but as mentioned hereinbefore, the phosphorus compound may be added later in the polymerization cycle. The bis-2-hydroxyethyl terephthalate was continuously fed into a "prepolymerization column" wherein glycol was continuously evolved from the extreme top of the column and a prepolymer of polyethylene terephthalate was removed near the top of the column. The addition of the ammonium phosphite or phosphates of the present invention led to the formation of by-product ammonia which was evolved from the top of the prepolymerization column with vaporous ethylene glycol. The prepolymer effluent from the prepolymerization column was then continuously fed into a mixer-type of reactor which effected more complete polymerization to produce polymer of the desired intrinsic viscosity. Thereafter, the polymer was continuously extruded into film in amorphous form; and this film was continuously stretched longitudinally and then transversely to substantially the same extent, i.e., about 3× in both directions and heat-set at 200° C. while held under tension to restrict dimensional change. The thickness of the resulting biaxially stretched film was 0.23–0.28 mil.

ously stretched longitudinally and then transversely to substantially the same extent in mutually perpendicular directions and heat-set while held under tension. The thickness of the resulting biaxially stretched film was 0.5 mil or 1.5 mils.

In Table III, the average time between cleaning the extrusion die lips is indicated for three operations compared to three control runs in which the phosphorus compound was omitted.

TABLE II

| Example | Catalyst combination and quantity [1] | Phosphorus additive and quantity [1] | Ratio of mols of phosphorus compound to total mols of catalyst | Insulation resistance (ohm-cm.) at 170° C. | Film thickness (mils) |
|---|---|---|---|---|---|
| 13 | 0.008 LiH, 0.02 Zn(Ac)$_2$.2H$_2$O, 0.03 Sb$_2$O$_3$ | 0.155 NH$_4$H$_2$PO$_4$ | 1.12 | 3.01×10$^{12}$ | 0.27 |
| 14 | 0.015 LiH, 0.02 Zn(Ac)$_2$.2H$_2$O, 0.03 Sb$_2$O$_3$ | 0.155 NH$_4$H$_2$PO$_4$ | 0.65 | 3.71×10$^{12}$ | 0.24 |
| 15 | 0.008–0.015 LiH, 0.02 Zn(Ac)$_2$.2H$_2$O, 0.03 Sb$_2$O$_3$ | 0.155 NH$_4$H$_2$PO$_4$ | 0.65–1.12 | 8 ×10$^{12}$ | |

[1] Weight percent of weight of dimethyl terephalate.

NOTE.— NH$_4$H$_2$PO$_4$, monoammonium phosphate; Sb$_2$O$_3$, antimony trioxide; LiH, lithium hydride; (NH$_4$)$_2$HPO$_4$, diammonium phosphate; Mn(Ac)$_2$.2½H$_2$O, Hydrated manganese acetate; Zn(Ac)$_2$.2H$_2$O, zinc acetate dihydrate.

*Examples 16–18*

These examples illustrate continuous operations in the presence of a phosphorus compound of this invention compared to control runs wherein the phosphorus compound was omitted. The ester interchange and polymerization catalysts employed in the control runs were as follows:

| | Percent |
|---|---|
| Lithium hydride | 0.005–0.006 |
| Zinc acetate dihydrate | 0.015 |
| Antimony trioxide | 0.03 |

In Examples 16–18, the catalyst system contained the same amounts of zinc acetate dihydrate and antimony trioxide indicated above, and the other components were as follows:

Lithium hydride was varied from 0.002–0.006% during the runs
Monoammonium phosphate, 0.09%

All the above percentages are by weight, based upon the weight of dimethyl terephthalate fed to the system.

In these runs, ethylene glycol and dimethyl terephthalate were continuously fed to an ester interchange column, the mol ratio of glycol/dimethyl terephthalate being about 2.4/1. As described hereinbefore, ester interchange and polymerization catalysts were fed to the ester interchange column along with the glycol and dimethyl terephthalate. The catalysts were introduced into the system as dispersions or solutions in glycol. The monoammonium phosphate was added to the system after ester interchange and prior to the prepolymerization step.

The product of ester interchange, essentially bis-2-hydroxyethyl terephthalate was continuously injected into the bottom of an upflow "prepolymerization column" wherein glycol was continuously evolved from the extreme top of the column, and a prepolymer of polyethylene terephthalate was removed near the top of the column. At this stage the presence of the monoammonium phosphate in the prepolymerizing mass led to the formation of by-product amomnia which was evolved from the top of the prepolymerization column with the vaporous ethylene glycol. The prepolymer effluent was then fed into a mixer-type of reactor which effected more complete polymerization to produce polymer of the desired intrinsic viscosity. The molten polymer was then continuously fed to an extrusion die having a slot-type orifice with opposed flexible lips for adjusting the thickness of film extruded therefrom. The amorphous film was continu-

TABLE III

| Example | Total time of operation (hours) | Average frequency of cleaning die lips (hours) |
|---|---|---|
| 16 | 120 | 60 |
| Control | 96 | 6.8 |
| 17 | 592 | 74 |
| Control | 128 | 16 |
| 18 | 336 | 56 |
| Control | 72 | 4.2 |

*Examples 19–21*

Continuous polymerization processes were carried out to prepare polyethylene terephthalate film as described in Examples 16–18, with the following ester interchange and polymerization catalyst systems; similar beneficial results were obtained when the polymerization was carried out in the presence of a phosphorus compound of this invention.

Example 19: Percent
    Manganous acetate _____ 0.045
    Antimony trioxide _____ 0.02–0.03
    Monoammonium phosphate _____ 0.09

Example 20: Percent
    Zinc acetate dihydrate _____ 0.015
    Antimony trioxide _____ 0.03
    Monoammonium phosphate _____ 0.09

Example 21: Percent
    Zinc acetate dihydrate (used as both an ester interchange and polymerization catalyst) _____ 0.03–0.07
    Monoammonium phosphate _____ 0.09

All concentrations are by weight, based upon the weight of dimethyl terephthalate.

These runs were repeated without the monoammonium phosphate. In all cases in the presence of a phosphorus compound, the times between die lip cleanings were from 3–10 times longer than when the polymerization was carried out in the absence of a phosphorus compound of this invention.

Although the process and advantages of the present invention have been particularly described with respect to the preparation of polyethylene terephthalate, it should be understood that the purview of the present invention is meant to include modified polyethylene terephthalates, i.e., modified with small quantities, e.g., up to 20% of other dicarboxylic acids. For example, glycol, terephthalic acid, or a dialkyl ester thereof, and a second acid or ester thereof may be reacted together to form a copolyester, the second acid being selected from the group consisting of isophthalic acid, bibenzoic acid, hexahydro terephthalic acid, adipic acid, sebacic acid, azelaic acid, the naphthalic acids, 2,5-dimethyl terephthalic acid and bis-p-carboxyphenoxyethane.

It is also within the scope of the present invention to prepare polyesters by reacting other glycols beside ethylene glycol, such glycols being selected from the series $HO(CH_2)_nOH$ where "$n$" is an integer from 2–10, inclusive. And, in place of dimethyl terephthalate, any of the terephthalic esters of saturated aliphatic monohydric alcohols containing up to and including seven carbon atoms may be employed.

It should be emphasized that polyethylene terephthalate film prepared in accordance with the present invention, is most useful as a dielectric when it has been oriented, e.g., stretched and/or rolled, in both directions to form a substantially balanced film, i.e., has substantially the same physical properties as measured in both directions. The oriented film is heat-set between 150°–250° C. while maintained under tension. When forming a balanced film by stretching in both directions, the best film is that stretched to about the same extent in both directions between 2.5× to 3.25×.

In film form, polyethylene terephthalate may be used in a large variety of applications; and, owing to the outstanding strength and toughness of the film, it can be used in calipers as low as 0.00025" (0.25 mil). On the other hand, films prepared in accordance with the present process have a greater degree of transparency and clarity than films prepared in the absence of a phosphorus compound. These highly transparent films are useful in a great variety of glazing applications and in other uses where clarity is required in thicknesses of 5–10 mils and greater. Polyethylene terephthalate film having a high insulation resistance, as produced in accordance with the process of this invention, may be employed in a great variety of electrical applications, that is, as a dielectric, for example, in capacitors, as slot insulation for motors, primary insulation for heat-resistant wire, pressure-sensitive electrical tape, split mica insulating tape, i.e., mica sheet laminated between film, small condensers, metal foil laminated to film or film having an inherent metal coating, weather-resistant electrical wire, i.e., a conductor wrapped with film coated with asphalt, as a wrapping for submerged pipe to insulate against ground currents, as primary and secondary insulation in transformer construction, as a dielectric in electroluminescent structures, etc.

In employing the films of the present invention, it may in some instances be desirable to size the film to increase film slip. It has been found that bentonite, in very finely divided form, is a satisfactory sizing for the electrical insulation films described herein. Aqueous dispersions of bentonite containing about 1% bentonite, by weight of the total dispersion, may be prepared by adding bentonite powder slowly to water which is being vigorous agitated. All bentonite particles over 4 or 5 microns across their major axes are then removed from the dispersion by passing the dispersion through a continuous super centrifuge. The preferred sizing dispersion is one containing more than about 20% of particles (by weight) which range in size from 1.5–4 microns. The sizing composition is preferably continuously sprayed onto one side of a moving film which is thereafter passed through a dryer to remove water.

Following are additional advantages which characterize the present invention: The ammonium phosphites and phosphates are relatively inexpensive additives, are alkaline in their effect upon the reaction medium, and do not lead to the formation of objectionable by-products. Ammonia is formed as a by-product of the reaction between the subject ammonium phosphites or phosphates and mixtures of bis-2-hydroxyethyl terephthalate and low molecular weight polyethylene terephthalate, and the ammonia is quickly and easily eliminated from the system with the vaporized ethylene glycol. Furthermore, the monoammonium and diammonium salts of phosphoric acid and the monoammonium salt of phosphorus acid are soluble in ethylene glycol, and the salts may be added to the polymerization system in solution form. The outstanding degree of clarity and transparency of the films produced in accordance with the present process contributes materially to the versatility of this film for use in packaging applications of all varieties. Furthermore, because of the outstanding strength properties of the present polyethylene terephthalate film, it may be employed as a primary or secondary container closure for all types of containers presently employed for food products, serums, liquid products such as motor oils and liquid detergents, etc. It should be emphasized that the film may be applied as a primary or secondary closure for milk bottles, soft drink bottles, "tin" cans, metal beverage containers, serum bottles, and the like, by a variety of possible techniques which provide for forming a smooth, tight fitting top and/or bottom closure.

The type of film which may be applied as a container closure may be one which has been stretched and/or rolled in one or preferably two directions with or without heat-setting. That is, a film which has been elongated in two directions by stretching and/or rolling steps may be heat-set by exposing the film to an elevated temperature, e.g., 200°–250° C., or the film may not be heat-set so that it takes the form of a heat-shrinkable material, that is, it will shrink in the directions in which it has been elongated when subjected to temperatures in excess of about 70°–80° C. The type of film, i.e. shrinkable or heat-set, best suited for forming a container closure will depend to a great degree upon the particular method by which the film is applied to close such containers as bottles of all types, metal containers such as "tin" cans, etc.

Either type of film may be applied by employing a so-called drape-forming technique whereby the film is clamped tightly in a frame or in a ring which is larger in dimensions (e.g., in diameter) than the outside dimensions (diameter) of the container being closed. The film is heated normally to a temperature of at least 100° C. in order to permit easy stretching, and the frame or ring is lowered into contact with the base upon which the container is resting, this movement stretching the film over the top of the container. For example, in the case of forming a primary closure on a milk bottle, the film is stretched over the top of the bottle and forms a tent-like cover over the bottle. When the ring or frame in which the film is clamped has touched the base upon which the bottle rests, the atmosphere enclosed by the film is evacuated to draw the stretched film tightly around the bottle. Upon cooling, the film may be trimmed at any point below the top of the bottle to form a tightly-fitting bottle cap or hood which may be employed as either a primary or secondary closure. When employed as a secondary closure it normally serves to keep the top and lips of the bottle clean and functions as a tamperproof closure. The technique of drape-forming the present polyethylene terephthalate films over the open ends of any type of container may be modified to suit the particular configuration of the container to which the film is being applied.

Other technique of applying film as a primary or secondary container closure involves the use of an applied positive pressure to form a hot film around the top or over the end of the container in question. For example, the film is disposed horizontally over the top of the container and once again may be clamped in a ring or frame; and after heating the film so that it easily stretches, a positive pressure is applied upon upper surface of the film.

The film is then forced into intimate contact with the top or end of the container, and the film is formed around the configuration of the open end of the container to which it is being applied. In an alternative but similar procedure, the film may be clamped into a ring or frame, heated to facilitate stretching, and thereafter the open end of the container may be pushed into the film by using an elevator arrangement. This operation also forms the film and stretches it over the open end of the container to form a tight-fitting end closure.

Any of the above-described techniques of forming a film closure over the end of the container by stretching the film over the container may be modified by employing a hot wire or hot jaw arrangement which clamps itself over the film and around the neck of a container (at strategic points below the actual end of the container). This hot wire or hot jaws serves to sever the film formed over the container top from that which is stretched down over the sides of the container. In addition, the hot jaw or hot wire serves to shrink the film tightly around the neck of the container so that it forms a substantially liquid-tight cap. In other words, the steps of stretching a polyethylene terephthalate film over the end of a container, e.g., serum bottle or milk bottle, may be combined with the use of a hot jaw or ring arrangement to pull the film tightly around the neck of the container and shrink it tightly to the outside walls thereof and simultaneously sever the film to trim it and form a neatly appearing container closure. It should be pointed out that the film may be stretched at room temperature, if the amount of stretch required is not excessive, but preferably the film should be heated to facilitate stretching.

Another approach to providing containers with a primary or secondary closure fabricated from a polyethylene terephthalate film, is to prepare preformed container caps from sheets of film by employing well-known techniques of forming sheets of film into the form of caps which may then be shrunken onto the ends or tops of various containers. These preformed caps may be formed into the shape of container closures by employing one or more variations of the technique described and claimed in copending application U.S. Serial No. 360,849, filed June 10, 1953, in the name of R. C. Schilly. These preformed container closures may be formed from unstretched, heat-shrinkable, or stretched heat-set polyethylene terephthalate film. The closures may then be placed over the ends or over the top of a particular container, held in place, and permitted to shrink against the walls of the container by subjecting the closure to a source of heat such as hot air, steam, radiant heat, etc.

A unique variation of forming preformed container closures and shrinking these onto a particular container involves forming a closure, e.g., in the form of a cap as described above. The top portion of the cap or closure, that is, the horizontal portion, may then be heat-set by clamping this section between two hot surfaces while simultaneously blowing cool air onto the vertical sides of the cap to prevent a significant rise in the temperature of the sides of the preformed cap or closure. By this procedure the top or horizontal portion of the preformed closure is heat-set and will not shrink when the cap is ultimately subjected to elevated shrinking temperatures. This type of closure (cap) is applied by fitting it over the end or top of a container, clamping it in place so that the top portion fits tightly against the top of the container, and thereafter employing a hot jaw or clamping mechanism to heat and thereby shrink the heat-shrinkable sides of the preformed cap against the walls of the container.

In general, in order to apply the films of the present invention as container closures, any suitable technique of uniformly stretching a sheet of the film over the end or top of a particular container along with shrinking the film tightly and smoothly against the outside walls of the container may be employed. Shrinkage of the film may be effected by blowing hot air upon the film closure, immersing the container closure in hot water (at a temperature of at least about 75° C.), applying radiant heat, or using other heat sources.

It should be emphasized that all of the above techniques may be employed for completely encasing a glass container of any variety, e.g., serum bottles, milk bottles, incandescent light bulbs, flash bulbs, fluorescent lighting tubes, radio and television tubes, etc., in an oriented film of the present invention. For example, incandescent light bulbs or television picture tubes may be encased in a sheet of polyethylene terephthalate film by employing a drape-forming technique whereby the film is applied to the face of the bulb or tube, and then stretched tightly around the face to cover the convex contour of the after portion of the bulb or tube. Covering the entire glassed area or a major portion of a fluorescent tube or television picture tube serves to encase the glassed area in a covering which eliminates shattering if the tube or bulb is dropped or if the television picture tube explodes.

Heat-shrinkable film (non-heat-set film) for use in any of the aforementioned applications or for general use in bundling or tight wrapping applications is film which is normally stretched about 3× (where × equals the original dimension of the film) in both directions. On the other hand, the film may be stretched only in one direction, e.g., 2× in one direction as described and claimed in copending application U.S. Serial No. 366,627, filed July 7, 1953, in the name of T. A. Grabenstein. The heat-shrinkable film may be employed in a wide variety of end uses, for example, as heat-shrinkable bands for beverage bottles and other types of containers, and as a covering for capacitors of all varieties, particularly capacitors which have been rolled from a metallized film prepared by depositing a metal coating upon one or both surfaces of a polyethylene terephthalate film produced in accordance with the present invention, stretched in two directions and heat-set.

Oriented polyethylene terephthalate film, particularly film produced in accordance with the present invention, may be employed in a wide variety of known end uses. Some of the less obvious end uses include trampolines, as a barrier under roofing to prevent dripping of molten roofing material into structures during fires, as an expandable covering for popcorn containers containing oil suitable for directly cooking in the container, as a post-formed structure for luminous sealings, as a material of construction for summer type rugs wherein twisted strands of film are used as yarn for the warp or fill, as a tire cord material in the form of twisted strands of film, as a protective covering for camel-back, as a packaging material for dynamite, as a replacement for glass or other types of plastic films in electric fuse windows, as a material of construction for scouring pads wherein the individual strands are twisted strands of film, as a material of construction for phonograph records wherein the film is laminated to paper, as a base material for making map negatives (wherein the film is coated and the map is scribed on the coated film which is thereafter used as a negative), as a base material for photographic uses in general, as a material of construction for zipper binders wherein film is laminated to paper using a latex adhesive, and a myriad of other uses.

In many of the foregoing end uses it is necessary to have a film which is readily heat-sealable with conventional conduction-type heat-sealing equipment. The oriented polyethylene terephthalate film of this invention may be made more readily heat-sealable by applying polymeric coatings to one or both sides of the film. Moistureproof polymeric coatings which may be applied include those of polyvinylidene chloride and copolymers of vinylidene chloride with one or more other polymerizable materials as the alkyl acrylates (methyl acrylate, ethyl acrylate, 2-ethyl hexyl acrylate, butyl acrylate, etc.), acrylonitrile, and vinyl chloride, the degree of moistureproofness depending upon the amount of vinylidene chloride in the copolymer. Coatings containing cellulose nitrate or polyethylene may also be applied for the same purpose. Other types of polymeric coatings may be applied to improve mainly the heat-sealability of the film, these coatings including polyvinyl acetals (polyvinyl butyral), polyvinyl acetate, polyamides of all types, and polyesters such as those derived by reacting glycol and terephthalic acid or an alkyl ester thereof with a second acid or alkyl ester thereof from the group consisting of sebacic acid, isophthalic acid and hexahydro terephthalic acid. In general, the polymeric coatings may be applied from hot melts, solvent solutions or aqueous dispersions.

What is claimed is:

1. In a process of making highly polymeric polyethylene terephthalate having an intrinsic viscosity of at least 0.55 wherein an alkyl ester of terephthalic acid having 1–7 carbon atoms in the alkyl group is reacted with a polymethylene glycol having from 2–10 carbon atoms in the presence of an ester interchange catalyst to effect ester interchange and the resulting bis glycol ester is subsequently polymerized, the improvement which comprises polymerizing said bis glycol ester until a film-forming polymer is produced in the presence of a catalyst system comprising catalytic amounts of (1) an alkaline metal from the group consisting of lithium, sodium, calcium and magnesium and their hydrides, alcoholates, chlorides and glycol-soluble salts of monocarboxylic acids; (2) a glycol-soluble salt of a monocarboxylic acid and a metal from the group consisting of zinc, manganese and cadmium; (3) an antimony compound from the group consisting of antimony trioxide, antimonyl potassium tartrate, antimonous oxychloride, antimony trifluoride and sodium antimonyl hydroxy acetate; and (4) at least 0.05%, based on the weight of the alkyl ester of terephthalic acid, of a phosphorus compound from the group consisting of monoammonium phosphate, diammonium phosphate and monoammonium phosphite.

2. A process as in claim 1 wherein the phosphorus compound is monoammonium phosphate.

3. A process as in claim 1 wherein the phosphorus compound is diammonium phosphate.

4. A process as in claim 1 wherein the phosphorus compound is monoammonium phosphite.

5. In a process of making highly polymeric polyethylene terephthalate having an intrinsic viscosity sufficient to provide a self-sustaining film of the polymer wherein an alkyl ester of terephthalic acid having 1–7 carbon atoms in the alkyl group is reacted with a polymethylene glycol having from 2–10 carbon atoms in the presence of an ester interchange catalyst to effect ester interchange and the resulting bis glycol ester is subsequently polymerized, the improvement which comprises polymerizing said bis glycol ester until a film-forming polymer is produced in the presence of a catalyst system comprising (1) 0.003–0.015%, based on the weight of the alkyl ester of terephthalic acid, of an alkaline metal from the group consisting of lithium, sodium, calcium and magnesium and their hydrides, alcoholates, chlorides and glycol-soluble salts of monocarboxylic acids; (2) 0.02–0.05%, based on the weight of the alkyl ester of terephthalic acid, of a glycol-soluble salt of monocarboxylic acid and a metal from the group consisting of zinc, manganese and cadmium; (3) 0.02–0.05%, based on the weight of the alkyl ester of terephthalic acid, of an antimony compound from the group consisting of antimony trioxide, antimonyl potassium tartrate, antimonous oxychloride, antimony trifluoride and sodium antimonyl hydroxy acetate; and (4) at least 0.05%, based on the weight of the alkyl ester of terephthalic acid, of a phosphorus compound from the group consisting of monoammonium phosphate, diammonium phosphate and monoammonium phosphite.

6. A process as in claim 5 wherein the group (1) catalyst is lithium hydride.

7. A process as in claim 5 wherein the group (2) catalyst is zinc acetate.

8. A process as in claim 5 wherein the group (3) catalyst is antimony trioxide.

9. A process as in claim 5 wherein the phosphorus compound is monoammonium phosphate.

10. A process as in claim 5 wherein the phosphorus compound is diammonium phosphate.

11. A process as in claim 5 wherein the phosphorus compound is monoammonium phosphite.

12. In a process of making highly polymeric polyethylene terephthalate having an intrinsic viscosity sufficient to provide a self-sustaining film of the polymer wherein an alkyl ester of terephthalic acid having 1–7 carbon atoms in the alkyl group is reacted with a polymethylene glycol having from 2–10 carbon atoms in the presence of an ester interchange catalyst to effect ester interchange and the resulting bis glycol ester is subsequently polymerized, the improvement which comprises polymerizing said bis glycol ester until a film-forming polymer is produced in the presence of a catalyst system comprising (1) 0.003–0.015%, based on the weight of the alkyl ester of terephthalic acid, of lithium hydride; (2) 0.02–0.05%, based on the weight of the alkyl ester of terephthalic acid, of zinc acetate; (3) 0.02–0.05%, based on the weight of the alkyl ester of terephthalic acid, of antimony trioxide; and (4) at least 0.05%, based on the weight of the alkyl ester of terephthalic acid, of a phosphorus compound from the group consisting of monoammonium phosphate, diammonium phosphate and monoammonium phosphite.

References Cited in the file of this patent

UNITED STATES PATENTS

| | | |
|---|---|---|
| 2,249,950 | Fuller | July 22, 1941 |
| 2,497,376 | Swallow et al. | Feb. 14, 1950 |
| 2,650,213 | Hofrichter | Aug. 25, 1953 |

FOREIGN PATENTS

| | | |
|---|---|---|
| 588,833 | Great Britain | June 4, 1947 |